(12) United States Patent
Mizutani

(10) Patent No.: US 9,240,856 B2
(45) Date of Patent: Jan. 19, 2016

(54) NETWORK SYSTEM, NETWORK APPARATUS, AND METHOD OF CONTROLLING NETWORK

(75) Inventor: Kenji Mizutani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 54 days.

(21) Appl. No.: 14/235,305

(22) PCT Filed: Jul. 27, 2012

(86) PCT No.: PCT/JP2012/004797
§ 371 (c)(1),
(2), (4) Date: Jan. 27, 2014

(87) PCT Pub. No.: WO2013/018337
PCT Pub. Date: Feb. 7, 2013

(65) Prior Publication Data
US 2014/0133863 A1    May 15, 2014

(30) Foreign Application Priority Data

Jul. 29, 2011 (JP) ................................. 2011-166222

(51) Int. Cl.
*H04J 14/02* (2006.01)
*H04B 10/07* (2013.01)
(52) U.S. Cl.
CPC ............ *H04J 14/0227* (2013.01); *H04B 10/07* (2013.01); *H04J 14/0257* (2013.01); *H04J 14/0269* (2013.01); *H04J 14/0212* (2013.01)
(58) Field of Classification Search
CPC .................. H04J 14/02; H04J 14/0201; H04J 14/0227–14/023; H04J 14/0278; H04B 10/40; H04B 10/50; H04B 10/572

USPC ................................... 398/25, 34, 43, 79, 182
See application file for complete search history.

(56) References Cited

U.S. PATENT DOCUMENTS 5,212,577 A    5/1993 Nakamura et al.
5,949,562 A *  9/1999 Kubota et al. .................... 398/79
(Continued)

FOREIGN PATENT DOCUMENTS

| JP | 3-214831 A | 9/1991 |
|---|---|---|
| JP | 2001-249053 A | 9/2001 |

(Continued)

OTHER PUBLICATIONS

B.C. Collings, "Wavelength Selectable Switches and Future Photonic Network Applications", Proc. Photonics in Switching, Institute of Electrical and Electronic Engineers (IEEE), 2009, pp. 1-4.

(Continued)

*Primary Examiner* — Li Liu

(57) ABSTRACT

A network apparatus includes a plurality of transceivers (110) each of which has a frequency variable characteristic and communicates on an allocated channel, a channel allocation unit (154) which allocates channels of standby transceivers that are not connected to a network and are set to a standby state, among the plurality of transceivers (110) so that the channels are different from each other, a tuning unit (158) which tunes the standby transceivers to the frequencies of the allocated channels by changing respective parameters, and a selection unit (156) which preferentially selects and uses a transceiver having a short channel setting time among the standby transceivers, when a path is newly set in the network.

12 Claims, 16 Drawing Sheets

(56) References Cited

U.S. PATENT DOCUMENTS

| | | | |
|---|---|---|---|
| 5,949,563 A * | 9/1999 | Takada | 398/7 |
| 6,101,014 A * | 8/2000 | Majima | 398/69 |
| 6,172,782 B1 * | 1/2001 | Kobayashi | 398/9 |
| 7,099,578 B1 * | 8/2006 | Gerstel | 398/5 |
| 7,450,844 B2 * | 11/2008 | Nabeyama et al. | 398/7 |
| 2003/0048512 A1 * | 3/2003 | Ota | 359/152 |
| 2004/0247326 A1 * | 12/2004 | Iwata et al. | 398/198 |
| 2009/0089601 A1 * | 4/2009 | Nonaka et al. | 713/323 |
| 2009/0196598 A1 * | 8/2009 | Duan et al. | 398/5 |

FOREIGN PATENT DOCUMENTS

| | | |
|---|---|---|
| JP | 2010-161501 A | 7/2010 |
| JP | 4596181 B2 | 12/2010 |
| JP | 2011-101216 A | 5/2011 |

OTHER PUBLICATIONS

Kenji Sato, et al., "Wideband External Cavity Wavelength-Tunable Laser Utilizing a Liquid-Crystal-Based Mirror and an Intracavity Etalon", Journal of Lightwave Technology, Institute of Electrical and Electronic Engineers (IEEE), Aug. 2007, vol. 25, No. 8, pp. 2226-2232.

Pirelli, "Inegrable Tunable Laser Assembly (ITLA)", [online], 2008, PGT Photonics S.p.A., [searched on Apr. 22, 2011], Internet <URL: http://www.pirellibroadband.com/en_IT/browser/attachments/pdf/Pirelli_ITLA.pdf>.

Intel, "Intel(R) C-band Tunable Laser Performance and Design White Paper", [online], May 2003, Intel corporation, [searched on Apr. 22, 2011], Internet <URL: http://www.intel.com/design/network/papers/25299001.pdf>.

Ronan O'Dowd, "Automated PXI-based Screening and Characterisation of Tunable Lasers", Proceedings of the Lightwave Technologies in Instrumentation and Measurement Conference 2004, Institute of Electrical and Electronic Engineers (IEEE), Oct. 19-20, 2004, pp. 84-89.

EMCORE Confidential, "EMCORE TTX1994 Full Band Integratable Tunable Laser Assembly (ITLA)", Nov. 2009, Doc. No. 11FM1036C, pp. 1-36.

International Search Report for PCT Application No. PCT/JP2012/004797, mailed on Aug. 21, 2012.

* cited by examiner

FIG. 4

OPTICAL TRANSCEIVER
MANAGEMENT TABLE 160

| INSTALLED OPTICAL TRANSCEIVER MANAGEMENT NUMBER | STATE | STANDBY CHANNEL SETTING | CORRESPONDING CHANNEL |
|---|---|---|---|
| 1 | ACTIVATED | | |
| 2 | ACTIVATED | | |
| 3 | STANDBY | $\lambda 15$ | $\lambda 12 \sim \lambda 20$ |
| 4 | STANDBY | $\lambda 3$ | $\lambda 1 \sim \lambda 5$ |
| 5 | STANDBY | $\lambda 74$ | $\lambda 63 \sim \lambda 84$ |
| 6 | STANDBY | $\lambda 51$ | $\lambda 39 \sim \lambda 62$ |
| 7 | STANDBY | $\lambda 8$ | $\lambda 6 \sim \lambda 11$ |
| 8 | ACTIVATED | | |
| 9 | STANDBY | $\lambda 25$ | $\lambda 21 \sim \lambda 38$ |

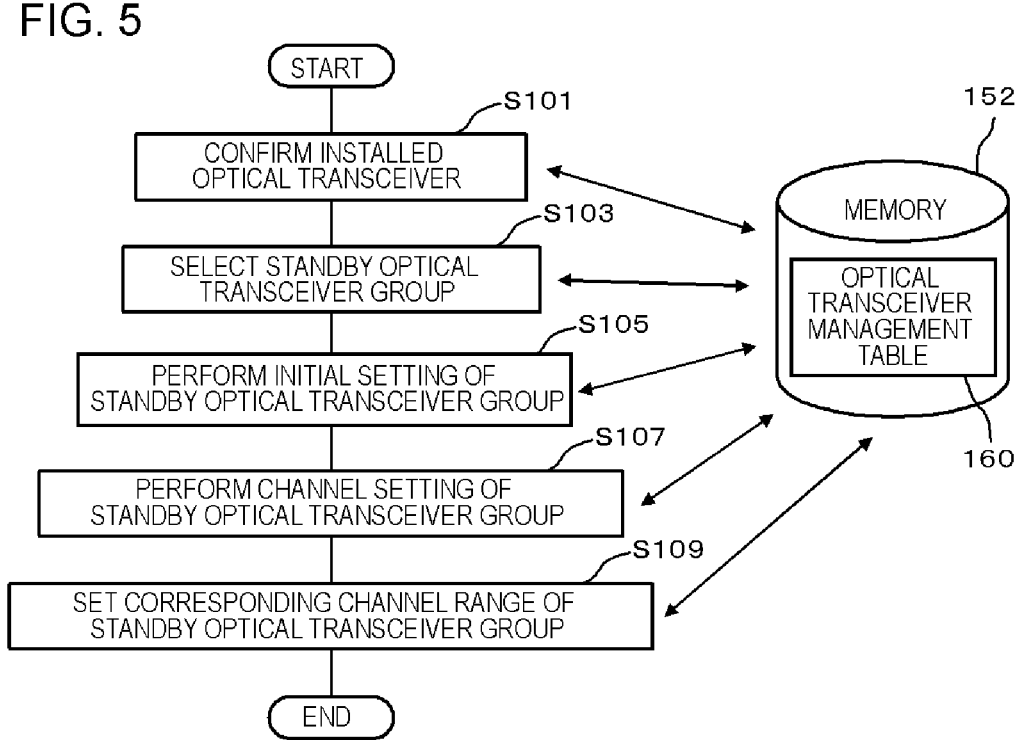

FIG. 6

OPTICAL TRANSCEIVER MANAGEMENT TABLE 160

| INSTALLED OPTICAL TRANSCEIVER MANAGEMENT NUMBER | STATE | STANDBY CHANNEL SETTING | CORRESPONDING CHANNEL |
|---|---|---|---|
| 1 | ACTIVATED | | |
| 2 | ACTIVATED | | |
| 3 | UNUSED | | |
| 4 | UNUSED | | |
| 5 | UNUSED | | |
| 6 | UNUSED | | |
| 7 | UNUSED | | |
| 8 | ACTIVATED | | |
| 9 | UNUSED | | |

FIG. 7

OPTICAL TRANSCEIVER
MANAGEMENT TABLE 160

| INSTALLED OPTICAL TRANSCEIVER MANAGEMENT NUMBER | STATE | STANDBY CHANNEL SETTING | CORRESPONDING CHANNEL |
|---|---|---|---|
| 1 | ACTIVATED | | |
| 2 | ACTIVATED | | |
| 3 | STANDBY | | |
| 4 | STANDBY | | |
| 5 | STANDBY | | |
| 6 | STANDBY | | |
| 7 | STANDBY | | |
| 8 | ACTIVATED | | |
| 9 | STANDBY | | |

FIG. 8

OPTICAL TRANSCEIVER MANAGEMENT TABLE 160

| INSTALLED OPTICAL TRANSCEIVER MANAGEMENT NUMBER | STATE | STANDBY CHANNEL SETTING | CORRESPONDING CHANNEL |
|---|---|---|---|
| 1 | ACTIVATED | | |
| 2 | ACTIVATED | | |
| 3 | STANDBY | λ15 | |
| 4 | STANDBY | λ3 | |
| 5 | STANDBY | λ74 | |
| 6 | STANDBY | λ51 | |
| 7 | STANDBY | λ8 | |
| 8 | ACTIVATED | | |
| 9 | STANDBY | λ25 | |

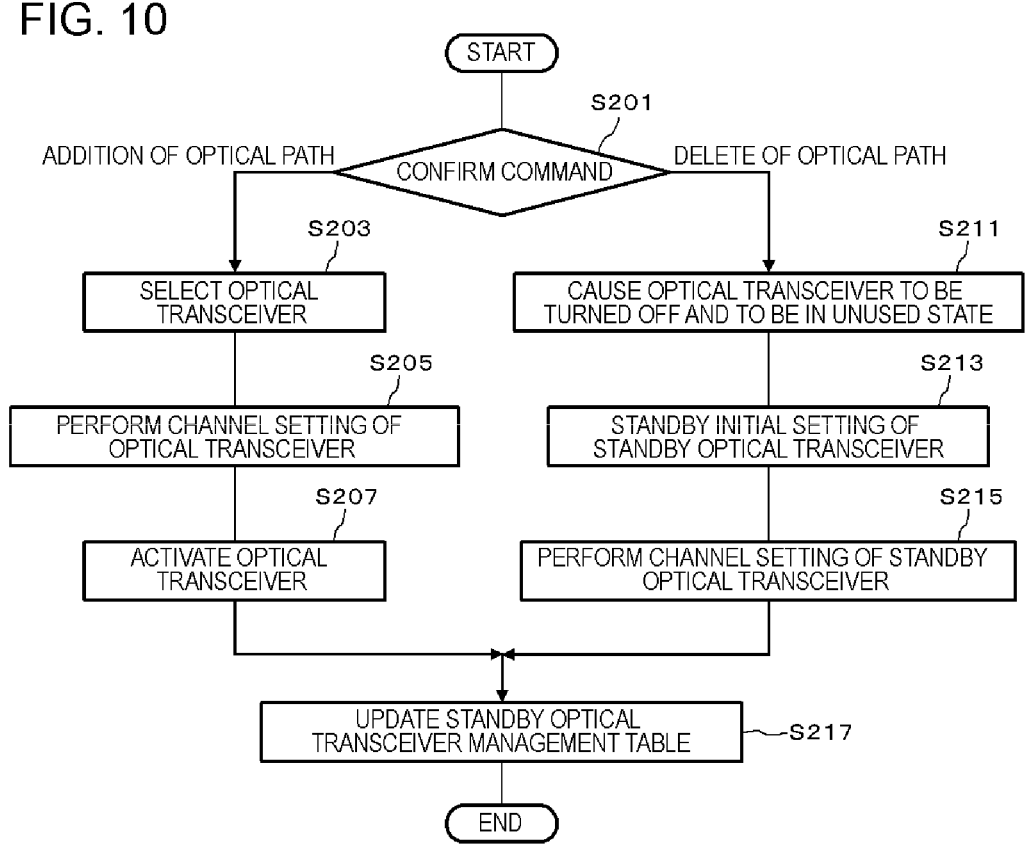

FIG. 11

OPTICAL TRANSCEIVER
MANAGEMENT TABLE 160

| INSTALLED OPTICAL TRANSCEIVER MANAGEMENT NUMBER | STATE | STANDBY CHANNEL SETTING | CORRESPONDING CHANNEL |
|---|---|---|---|
| 1 | ACTIVATED | | |
| 2 | ACTIVATED | | |
| 3 | STANDBY | $\lambda 15$ | $\lambda 12 \sim \lambda 20$ |
| 4 | STANDBY | $\lambda 3$ | $\lambda 1 \sim \lambda 5$ |
| 5 | STANDBY | $\lambda 74$ | $\lambda 50 \sim \lambda 84$ |
| 6 | ACTIVATED | | |
| 7 | STANDBY | $\lambda 8$ | $\lambda 6 \sim \lambda 11$ |
| 8 | ACTIVATED | | |
| 9 | STANDBY | $\lambda 25$ | $\lambda 21 \sim \lambda 49$ |

FIG. 12

OPTICAL TRANSCEIVER MANAGEMENT TABLE 160

| INSTALLED OPTICAL TRANSCEIVER MANAGEMENT NUMBER | STATE | STANDBY CHANNEL SETTING | CORRESPONDING CHANNEL |
|---|---|---|---|
| 1 | STANDBY | $\lambda 60$ | $\lambda 56 \sim \lambda 67$ |
| 2 | ACTIVATED | | |
| 3 | STANDBY | $\lambda 15$ | $\lambda 12 \sim \lambda 20$ |
| 4 | STANDBY | $\lambda 3$ | $\lambda 1 \sim \lambda 5$ |
| 5 | STANDBY | $\lambda 74$ | $\lambda 68 \sim \lambda 84$ |
| 6 | STANDBY | $\lambda 51$ | $\lambda 39 \sim \lambda 55$ |
| 7 | STANDBY | $\lambda 8$ | $\lambda 6 \sim \lambda 11$ |
| 8 | ACTIVATED | | |
| 9 | STANDBY | $\lambda 25$ | $\lambda 21 \sim \lambda 38$ |

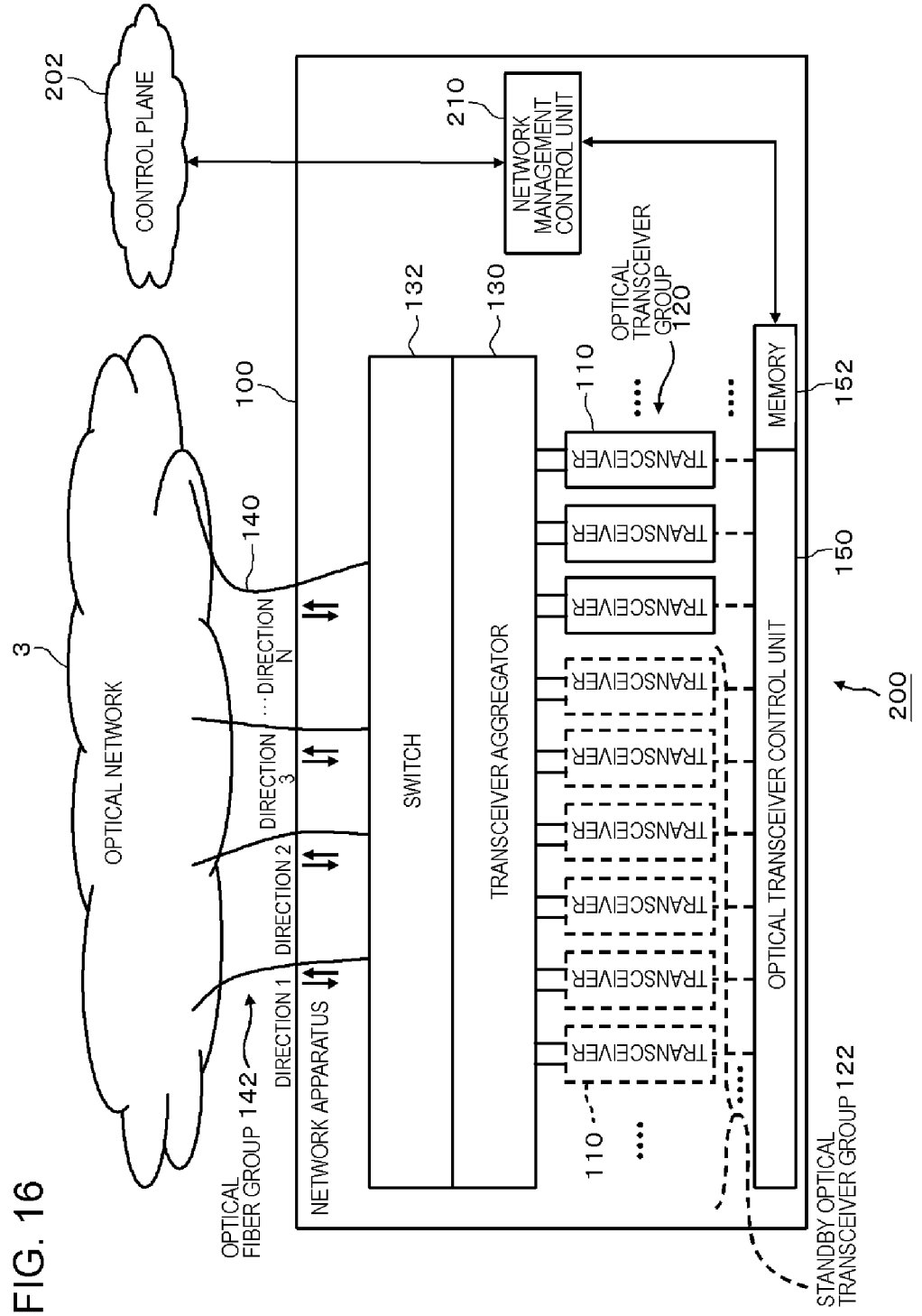

NETWORK SYSTEM, NETWORK APPARATUS, AND METHOD OF CONTROLLING NETWORK

This application is a National Stage Entry of PCT/JP2012/004797 filed on Jul. 27, 2012, which claims priority from Japanese Patent Application 2011-166222 filed on Jul. 29, 2011, the contents of all of which are incorporated herein by reference, in their entirety.

TECHNICAL FIELD

The present invention relates to a network system, a network apparatus, and a method of controlling a network, and more particularly to a network system, a network apparatus, and a method of controlling a network, which set paths by using a wavelength division multiplexing technology.

BACKGROUND ART

In optical communication networks, multi-channel support using a Dense Wavelength Division Multiplexing (DWDM) technology which enables high-capacity connections of Point-to-Point (P2P) and an Optical Cross Connect (OXC) using a frequency selection switch (Wavelength Select Switch (WSS)) having a multi (three or more) direction or degree switching function have been introduced, for the speeding-up of a network which will be accompanied by increase in communication amount and diversification of services in the future. The introduction of the OXC enables networks to be optimally reconstructed according to use states of the networks.

Further, as described in Non-Patent Document 1, a transceiver aggregator, in which a plurality of optical transceivers, a WSS, and the like are installed, is installed between an optical communication network and a client device, so the sharing of optical transceivers is in progress. Thus, the number of the installed optical transceivers can be reduced and Capital Expenditure (CAPEX) can be decreased. A method of sharing the optical transceivers has a variety of forms including a method in which each fiber direction or degree shares the optical transceivers and a method in which a plurality of fiber directions or degrees in bulk share the optical transceivers.

In addition, network update automation is in progress by the optical transceivers and the WSS within the network apparatus being controlled by a computer. An example of a network management system is disclosed in Patent Document 1 (Japanese Unexamined Patent Application Publication No. 2010-161501). The network management system of Patent Document 1 dynamically changes the configuration of a network depending on the use state in order to reduce power consumption of the entire network.

Prior to the automation, workers are required to go to each node station and to change network apparatuses at the time of update. However, due to the automation of the network update, the workers are not required to change the apparatuses, and Operating Expense (OPEX) also can be decreased. In addition, as described in Patent Document 1, the network can be dynamically optimized depending on the use state of the network.

Due to development of the network technology, it is expected that a plurality of unused optical transceivers are installed in each network apparatus and are dynamically set to an in-use state or a not in-use state depending on the use state of the network.

The unused optical transceivers are on standby in a state where the optical output is zero so that the light does not leak to the normal network. At this time, backup optical transceivers are on standby in a state where the backup optical transceivers are shared among the fiber directions or degrees of one or more and are activated to be connected to a network, when a new optical path is connected or a failure is recovered. It is desirable that the optical path setting time may be serviced instantly. Particularly, rapid optical path setting is required for restoration (network switching) at the time of failure recovery to minimize the impact of failures.

Optical transmission and reception devices are present as analog devices in the optical transceivers. With the introduction of DWDM technology in recent years, devices such as frequency tunable lasers and frequency tunable filters capable of controlling frequencies are used as the optical transmission and reception devices.

Although various types of frequency tunable lasers and filters exist, tuning parameters such as a refractive index, an electric voltage, an electric current or a temperature of a medium such as a semiconductor, a dielectric, a liquid crystal, or the like, are controlled in an analog manner at high precision for setting the frequency of these devices. Since these frequency control delay mechanisms have no significant difference therebetween, they will be described using a frequency tunable laser described in Patent Document 2 (Japanese Patent No. 4596181).

Patent Document 2 is a patent relating to a frequency tunable laser of an external resonator type. The frequency tunable laser described in Patent Document 2 has a configuration in which an external resonator is disposed between a semiconductor optical amplifier and an external mirror and at least a frequency selection filter and a frequency tunable filter are disposed in the inside thereof. The frequency selection filter is a periodic transparent filter with a transparent peak only in channels defined for use in communication applications, and a solid etalon filter is generally used therefor.

As illustrated in FIG. 2 of Non-Patent Document 2, one frequency is selected by a frequency tunable filter from a plurality of peak frequencies of the frequency selection filter, and laser is oscillated in any frequency. In other words, the number of frequency tuning parameters of the frequency tunable laser described in Patent Document 2 is one and the peak frequency of the frequency tunable filter is tuned, thereby allowing the frequency variable characteristic to be achieved. The frequency tunable filter described in Patent Document 2 uses a liquid crystal-based frequency tunable mirror, and the frequency tuning parameter is an alternating voltage value to be applied to the liquid crystal. The refractive index of the liquid crystal is changed by changing the alternating voltage value so as to control the frequency, and thus the greater the voltage changes, the greater the frequency changes.

Channel setting in the frequency tunable laser described in Patent Document 2 is as follows. The alternating voltage value of the frequency tunable filter is first changed, and a coarse adjustment is performed on the peak frequency. Moreover, a fine adjustment combined with the stable operation of the laser beam is performed in the frequency tunable laser. This fine adjustment includes a constant light output control by a dither control, a frequency control for matching an oscillation frequency to an International Telecommunication Union (ITU) channel with high precision, and a phase control for operating a laser light at low noise.

In addition, as described in Non-Patent Document 5, various types such as a type which has two frequency tuning parameters exist as frequency tunable filters.

Patent Document 3 (Japanese Unexamined Patent Application Publication No. 2001-249053) discloses a frequency tunable laser used as a local oscillator for frequency selection.

RELATED DOCUMENT

Patent Document

[Patent Document 1] Japanese Unexamined Patent Application Publication No. 2010-161501
[Patent Document 2] Japanese Patent No. 4596181
[Patent Document 3] Japanese Unexamined Patent Application Publication No. 2001-249053

Non-Patent Document

[Non-Patent Document 1] B. C. Collings, "Wavelength Selectable Switches and Future Photonic Network Applications", Proc. Photonics in Switching, FrII 2-4, 2009, Institute of Electrical and Electronic Engineers (IEEE), 2009, pp. 1-4
[Non-Patent Document 2] Kenji Sato, et al. 5 members, "Wideband External Cavity Wavelength-Tunable Laser Utilizing a Liquid-Crystal-Based Mirror and an Intracavity Etalon", Journal of Lightwave Technology, Institute of Electrical and Electronic Engineers (IEEE), 2007, 25th edition, NO. 8, pp. 2226-2232
[Non-Patent Document 3] "Integrable Tunable Laser Assembly (ITLA)", [online], 2008, PGT Photonics S.p.A., [searched on Apr. 22, 2011], Internet <URL: http://www.pirellibroadband.com/en_IT/browser/attachments/pdf/Pirelli_ITLA.pdf>
[Non-Patent Document 4] "Intel(R) C-band Tunable Laser Performance and Design White Paper", [online], May, 2003, Intel corporation, [searched on Apr. 22, 2011], Internet <URL: http://www.intel.com/design/network/papers/25299001.pdf>
[Non-Patent Document 5] Ronan O'Dowd, "Automated PXI-based Screening and Characterisation of Tunable Lasers", Proceedings of the Lightwave Technologies in Instrumentation and Measurement Conference, Institute of Electrical and Electronic Engineers (IEEE), 2004, pp. 84-89

DISCLOSURE OF THE INVENTION

However, there is a problem that the setting time is delayed because there is a delay due to a control of an analog device within an unused optical transceiver in an optical path setting.

In the coarse adjustment of frequency in the frequency tunable laser described in the Patent Document 2, the larger the frequency tuning parameter variation, the more time is taken. This is because not only is time required for alternating voltage itself of the frequency tuning parameter to be stabilized, but also there is a need to be on standby until the liquid crystal itself is stabilized after the alternating voltage tuning. Furthermore, since the control performed by the fine adjustment which is performed combined with the stable operation of the laser light in the frequency tunable laser depends strongly on the peak frequency of the frequency tunable filter, fine control of the frequency tunable filter itself is also required. Based on this strong dependence, as the tuning amount of frequency tunable filter is great, the fine tuning takes more time. As a product characteristic using this method, a delay of at most one second occurs as described in Non-Patent Document 3.

In this manner, since the channel setting time for the optical path setting depends strongly on the change amount in frequency tuning parameter of the frequency tunable filter, as the change amount is great, it takes time. Not only does it take more time until frequency tuning parameter is stabilized as the change amount in frequency tuning parameter is great, but also time for fine adjustment for high performance of the property is also increased, thereby a large delay has occurred.

In addition, even if there are tuning parameters of two or more in the frequency tunable filter, as the tuning parameters are changed significantly, the tuning time in some parameters may be delayed.

For example, when a filter using a thermo-optic effect of a material as described in Non-Patent Document 4 is used, a possibility in which a delay may occur on the order of several tens of seconds as the tuning time is considered.

In addition, even in a digital coherent receiver that has been validated in a large-capacity transmission system in recent years, a similar delay problem exists even in the frequency tunable laser which is used as a local oscillator as described in Patent Document 3 for frequency selection.

In this manner, since there is a delay due to the control of the analog device of the transceiver in the network apparatus in the technologies described in the documents described above, there is a problem that the optical path setting takes time.

An object of the present invention is to provide a network system, a network apparatus, and a method of controlling a network in which the problem described above that it takes time for the optical path setting is solved.

A network apparatus of the present invention includes:
a plurality of transceivers each of which has a frequency variable characteristic and communicates on an allocated channel;
a channel allocation unit which allocates channels of standby transceivers that are not connected to a network and are set to a standby state, among the plurality of transceivers so that the channels are different from each other;
a tuning unit which tunes the standby transceivers to the frequencies of the allocated channels by changing respective parameters; and
a selection unit which preferentially selects and uses a transceiver having a short channel setting time among the standby transceivers, when a path is newly set in the network.

A network system of the present invention is a network system using the above network apparatus.

A method of controlling a network of the present invention is a method of controlling a network in which a network apparatus which controls a plurality of transceivers having frequency variable characteristics, including
allocating channels of standby transceivers that are not connected to a network and are set to a standby state, among the plurality of transceivers so that the channels are different from each other;
tuning the standby transceivers to the frequencies of the allocated channels by changing respective parameters; and
preferentially selecting and uses a transceiver having a short channel setting time among the standby transceivers, when a path is newly set in the network.

A program of the present invention is a program performing:
a procedure for allocating frequencies different from each other to channels of standby transceivers that are not connected to a network and are set to a standby state, among the plurality of transceivers;
a procedure for tuning the standby transceivers to the frequencies of the allocated channels by changing respective parameters; and a procedure for preferentially selecting and using a transceiver having a short channel setting time among the standby transceivers, when a path is newly set in the network.

In addition, any combination of the above constitutional elements, or a method, an apparatus, a system, a recording media, and a computer program each of which changeably represents the present invention in other forms are also effective as exemplary embodiments of the present invention.

In addition, various constitutional elements of the present invention need not be individual independent entities necessarily, and may be anything in which a plurality of constitutional elements are formed as one member, anything in which one constitutional element is formed as a plurality of members, anything in which certain constitutional elements are formed as a portion of other constitutional elements, anything in which a portion of certain constitutional elements and a portion of other constitutional elements are duplicated, or the like.

In addition, in the control method and the computer program of the present invention, a plurality of procedures are described in order, but the described order is not intended to limit the order of performing the plurality of procedures. Accordingly, when the control method and the computer program of the present invention are performed, the order of the plurality of procedures can be changed in a range which does not interfere with the content.

The plurality of procedures in the control method and the computer program of the present invention are not limited to be performed at different timings, respectively. For this reason, other procedures may be performed during the execution of a certain step, all or a part of the execution timings of a certain step and other procedures may be overlapped, or the like.

According to the present invention, a network system, a network apparatus, and a method of controlling a network, which can set optical paths at high speed, are provided.

BRIEF DESCRIPTION OF THE DRAWINGS

The above described object, other objects, features and advantages will be more apparent from preferred exemplary embodiments described later and the following accompanying drawings.

FIG. 4 is a diagram illustrating an example of a structure of an optical transceiver management table of the network apparatus according to the exemplary embodiment of the present invention.

FIG. 5 is a flowchart illustrating an example of the operation of the optical transceiver control unit at the time of an initial setting or at the time of a change setting of the network apparatus according to the exemplary embodiment of the present invention.

FIG. 6 is a diagram illustrating an example of the optical transceiver management table at the time of confirmation of a transceiver in the exemplary embodiment of the present invention.

FIG. 7 is a diagram illustrating an example of the optical transceiver management table at the time of selecting a transceiver in the exemplary embodiment of the present invention.

FIG. 8 is a diagram illustrating an example of the optical transceiver management table at the time of channel setting in the exemplary embodiment of the present invention.

FIG. 10 is a flowchart illustrating the optical path setting operation by the optical transceiver control unit of the network apparatus according to the exemplary embodiment of the present invention.

FIG. 11 is a diagram of an example of the optical transceiver management table after the optical path setting is performed, in the exemplary embodiment of the present invention.

FIG. 12 is a diagram of an example of the optical transceiver management table after optical paths are deleted, in the exemplary embodiment of the present invention.

FIG. 16 is a functional block diagram illustrating a configuration of an optical network system according to the exemplary embodiment of the present invention.

DESCRIPTION OF EXEMPLARY EMBODIMENTS

Figure 1:
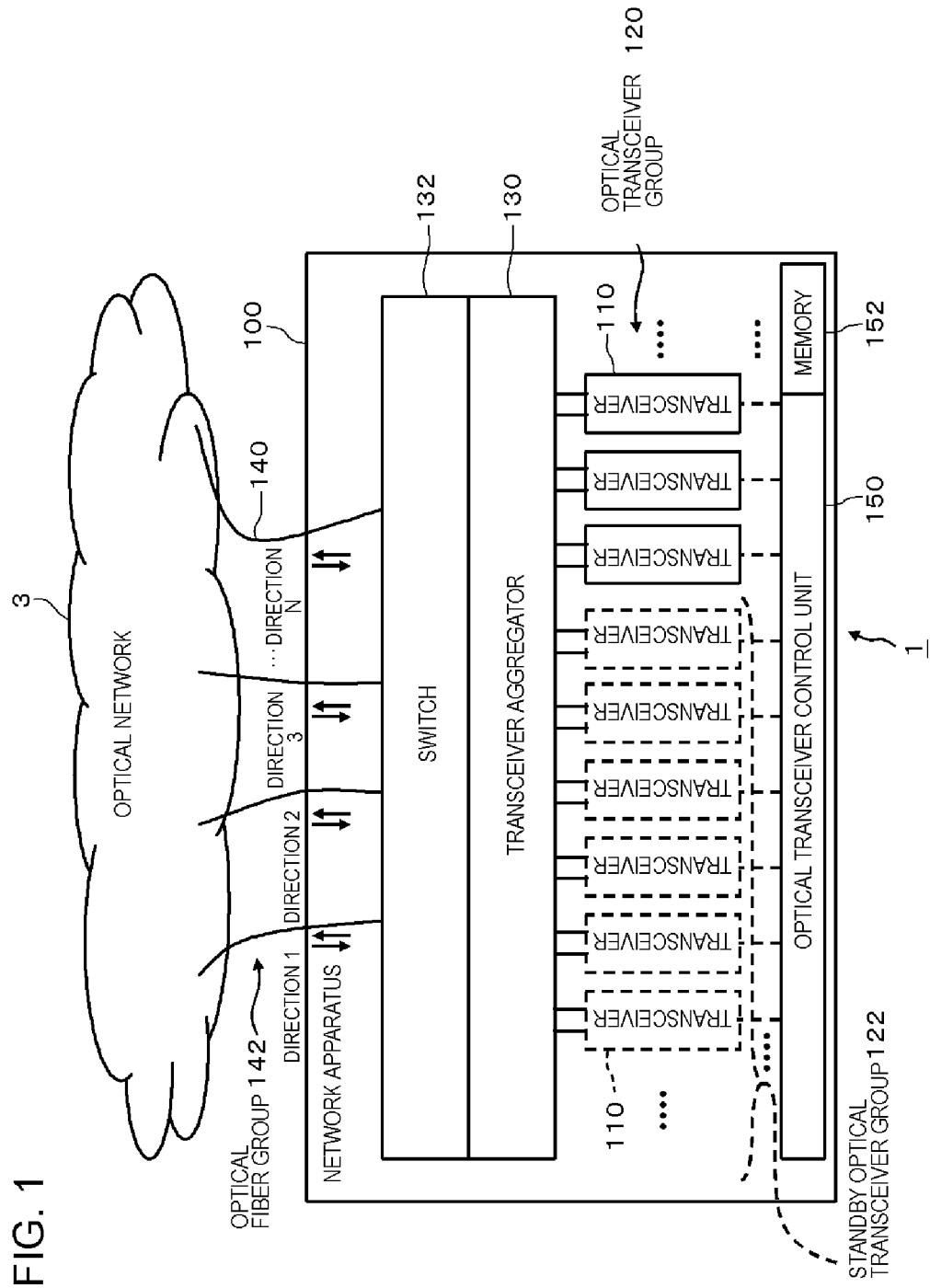
FIG. 1 is a functional block diagram illustrating a configuration of an optical network system according to an exemplary embodiment of the present invention.

Hereinafter, exemplary embodiments of the present invention will be described using drawings. In addition, the same reference numerals are given to the same constitutional elements in all drawings, so the description thereof will not be repeated.

First Exemplary Embodiment

FIG. 1 is a functional block diagram illustrating a configuration of an optical network system 1 according to an exemplary embodiment of the present invention. In addition, the configurations of parts which are not related to the essence of the present invention are not repeated and not illustrated in the following respective drawings.

As illustrated in FIG. 1, the optical network system 1 according to the present exemplary embodiment includes a network apparatus 100 connected to an optical network 3 through an optical fiber group 142 including a plurality of optical fibers 140 corresponding to respective directions or degrees (direction 1, direction 2, direction 3, . . . , and direction n, where n is a natural number) of the optical network 3. Here, "directions or degrees" are a plurality of fiber routes connected to the network apparatus 100, and means optical paths going out toward a plurality of nodes in the optical network 3 or optical paths incoming from a plurality of nodes in the optical network 3 toward the network apparatus 100.

The network apparatus 100 includes an optical transceiver group 120 including a plurality of optical transceivers 110 having frequency characteristics. The network apparatus 100 allocates respective channels (frequencies) to the plurality of optical transceivers 110 using Wavelength Division Multiplexing technology so as to set the respective optical paths. The network apparatus 100 has a function to perform a multiplex separation or a multiplex add of wavelengths of the optical paths used in optical communication.

In addition, although not shown, in the optical network system 1, a plurality of nodes (not shown) are constructed on the optical network 3. Each network apparatus 100 is installed in each node. The network apparatus 100 sets optical paths between nodes and controls communication.

The network apparatus 100 further includes a transceiver aggregator 130, a switch 132, and an optical transceiver control unit 150.

As described above, a plurality of optical transceivers 110 are prepared and connected to the transceiver aggregator 130. Then, the optical transceivers 110 in operation add or drop optical signals in any frequency in any direction or degree to the optical network 3, through the transceiver aggregator 130 and the switch 132.

Figure 2:
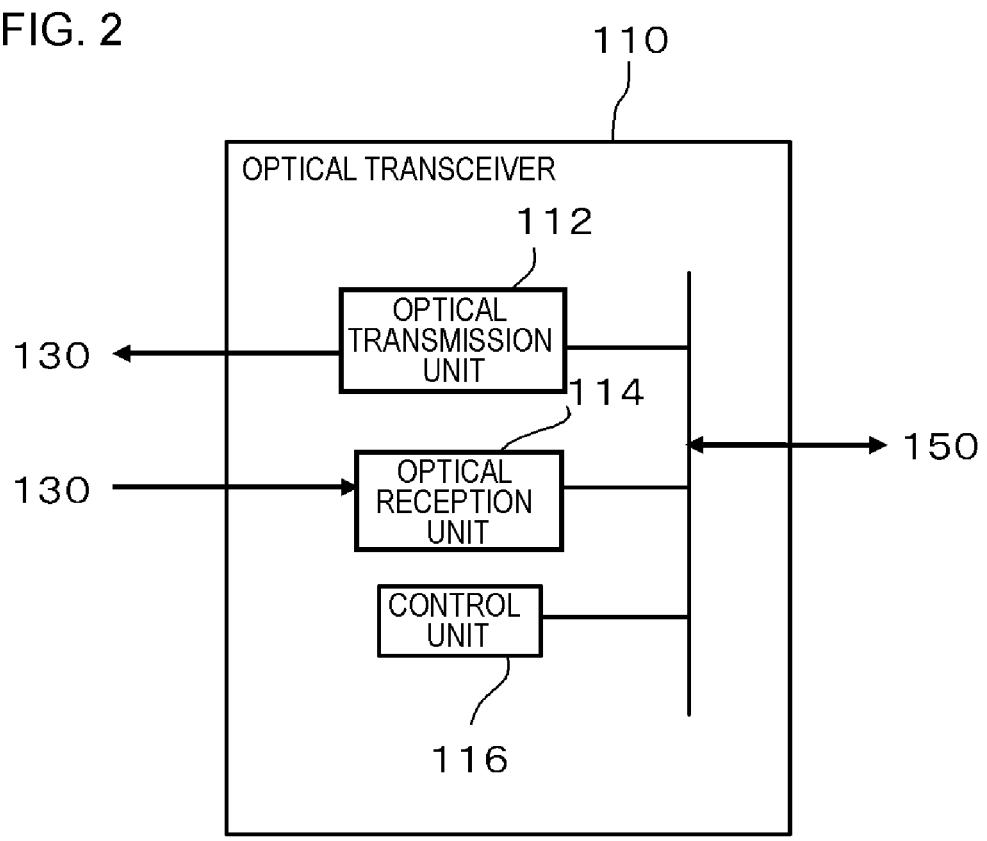
FIG. 2 is a functional block diagram illustrating a configuration of an optical transceiver of a network apparatus according to the exemplary embodiment of the present invention.

As illustrated in FIG. 2, each optical transceiver 110 includes at least an optical transmission unit 112, an optical reception unit 114, and a control unit 116.

The optical transmission unit 112 uses a frequency tunable laser for DWDM/WDM communication and outputs the optical signals of any channel among channels standardized by International Telecommunication Union Telecommunication Standardization Sector (ITU-T). It is described that the present exemplary embodiment uses a frequency tunable laser having one frequency tuning parameter described in Patent Document 2 (Japanese Patent No. 4596181) of the applicant of the present invention. It is assumed that the frequency tunable laser uses a liquid crystal and a filter capable of adjusting transmission peak wavelength of the liquid crystal by applying an electric voltage.

On the other hand, a frequency tunable filter (not shown) is arranged as necessary in front of the optical reception unit 114, and thus the optical reception unit 114 selects and receives only the frequency of any channel. The present exemplary embodiment has been described by assuming that the frequency tunable filter which is used for the frequency tunable laser of Patent Document 2 is used as a frequency tunable filter.

The control unit 116 controls the tuning parameters regarding a setting frequency of the optical transmission unit 112 or the optical reception unit 114, according to the control of the optical transceiver control unit 150 which will be described later.

On the other hand, a standby optical transceiver group 122 (in FIG. 1, indicated with a broken line), including standby transceivers 110 which are on standby and not connected to the optical network 3 (FIG. 1), is controlled by the control unit 116 according to the instruction from the optical transceiver control unit 150, and thus the standby optical transceiver group 122 is on standby in a state where the output thereof is off so as to prevent the optical signal from leaking to the optical network 3. Further, the control unit 116 sets the specified channels (referred to as "standby channel") in the optical transceivers 110 which are on standby, according to the instruction from the optical transceiver control unit 150 (FIG. 1). Here, the standby channels are specified to the optical transceivers 110 on standby, by the optical transceiver control unit 150 so as to allocate frequencies different among a plurality of optical transceivers 110 to the standby channels. In this manner, since frequencies of the standby channels among the optical transceivers 110 are shifted and set within a use band, it is possible to select the optical transceiver 110 having the smallest frequency difference between a setting channel and a standby channel at the time of optical path setting when the optical transceivers 110 are activated from the standby state, thereby shortening the time required for change setting of the frequency from the standby channel to the setting channel. Thus, the optical path setting can be speeded up. The setting frequency may be used not only in setting of the frequency tunable laser of the optical transmission unit 112 of the optical transceiver 110, but also in setting of the frequency tunable filter of the optical reception unit 114, as necessary.

In addition, in a case where anything similar to the frequency tunable filter (not shown) is arranged even in the transceiver aggregator 130 (FIG. 1) and operates simultaneously with the optical transceiver 110, a control is performed by the control unit 116 of each optical transceiver 110 in a similar manner to the corresponding optical transceiver 110.

In addition, although a tuning parameter for frequency setting of each optical transceiver 110 is controlled according to the instruction from the optical transceiver control unit 150, the operation of each constitutional element of the optical transceiver 110 according to the control is not related to the essence of the present invention, such that a detailed description thereof will be not repeated in the following description.

Figure 3:
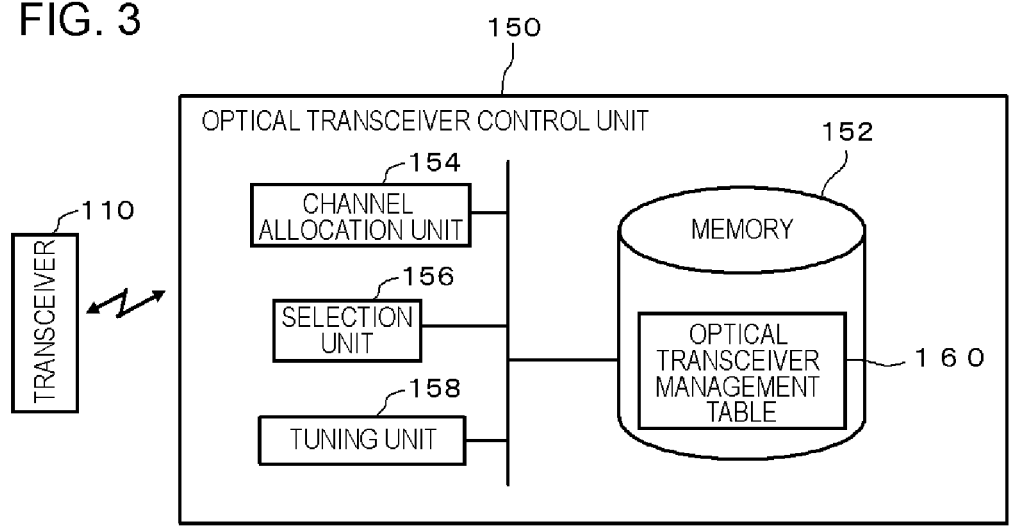
FIG. 3 is a functional block diagram illustrating a configuration of an optical transceiver control unit of the network apparatus according to the exemplary embodiment of the present invention.

FIG. 3 is a functional block diagram illustrating a configuration of the optical transceiver control unit 150 of the network apparatus 100 according to the exemplary embodiment of the present invention. The optical transceiver control unit 150 senses connecting conditions to the network 3 (FIG. 1) of the optical transceivers 110, and manages a usage status (such as used or unused) of the optical transceiver group 120 (FIG. 1). In addition, the optical transceiver control unit 150 has a function to control a standby status (when not used, during standby, during setting, during stop, or the like) of the standby optical transceiver and to manage channel setting that the standby optical transceiver stands by (standby channel setting), and a function to select which standby optical transceiver is used at the time of new path setting.

As illustrated in FIG. 3, the network apparatus according to the exemplary embodiment of the present invention (optical transceiver control unit 150 of the network apparatus 100) has a plurality of transceivers (optical transceivers 110) each of which has a frequency variable characteristic and communicates on an allocated channel, a channel allocation unit 154 which allocates frequencies different from each other to channels of standby optical transceivers 110 that are not connected to the network 3 and are set to a standby state, among the plurality of optical transceivers 110, a tuning unit 158 which tunes the standby optical transceivers 110 to the frequencies of the allocated channels by changing respective parameters, and a selection unit 156 which preferentially selects and uses an optical transceiver 110 having a short channel setting time among the standby optical transceivers 110, when a path is newly set in the network 3.

Specifically, the optical transceiver control unit 150 includes a channel allocation unit 154, a selection unit 156, a tuning unit 158, and a memory 152 that stores an optical transceiver management table 160 for managing optical transceivers 110 which are on standby (hereinafter, referred to as "standby optical transceiver").

A memory area of the memory 152 holds the optical transceiver management table 160 for managing the standby optical transceivers as illustrated in FIG. 4. The optical transceiver control unit 150 manages the standby optical transceiver group 122 (FIG. 1) based on table information of the optical transceiver management table 160.

As illustrated in FIG. 4, the optical transceiver management table 160 of the present exemplary embodiment includes a management number column 162 of all optical transceivers 110 (FIG. 1) installed in the network apparatus 100 (FIG. 1) of the present exemplary embodiment, a state column 164 that records the operation state, a standby channel setting column 166 indicating channels which are set in the standby optical transceivers 110, and a corresponding channel column 168 recording, when an optical path is newly set, the corresponding channels to be set (range of frequency) in association with which optical transceivers 110 on standby are used.

Returning to FIG. 3, the channel allocation unit 154 allocates channels (frequencies) different from each other to the standby optical transceivers 110 that are not connected to the network 3 (FIG. 1) and are set to a standby state, among the plurality of transceivers 110. The number N of the standby optical transceivers 110 which are unconnected is two or more, and setting frequencies different from each other are set to N units of unconnected standby optical transceivers 110. The channel allocation unit 154 records the allocated channels in the standby channel setting column 166 of the optical transceiver management table 160 (FIG. 4) stored in the memory 152. In the present exemplary embodiment, channels of a plurality of standby optical transceivers are randomly allocated using a random number function within the range of its frequency range of the network apparatus 100.

In addition, the channel allocation unit 154 allocates the range of the corresponding channel based on the relationship between the frequency tuning parameter of the frequency tunable filter or the frequency tunable laser of the optical transceiver 110, and its allocated channel (frequency). The details of the allocation will be described later. The channel allocation unit 154 records the range of corresponding channels allocated to each standby optical transceiver 110 in the corresponding channel column 168 of the optical transceiver management table 160 stored in the memory 152.

The tuning unit 158 accesses the memory 152 and performs tuning by controlling the parameter of each standby optical transceiver 110 based on the channel settings which are recorded in the standby channel setting column 166 of the optical transceiver management table 160 of FIG. 4 and allocated by the channel allocation unit 154 so as to set channels. Here, the tuning parameter of the optical transceiver 110 is for setting the frequency (channel) of the frequency tunable laser or the frequency tunable filter, and includes for example, a refractive index, an electric voltage, an electric current, or a temperature of a medium of a semiconductor, a dielectric, a liquid crystal, or the like. The tuning unit 158 controls the tuning parameter of each optical transceiver 110 in an analog manner. The present exemplary embodiment is configured of only one kind of each of the frequency tunable laser or the frequency tunable filter which is used in the optical transceiver 110.

In addition, after the channel setting of the optical transceiver 110 is ended, the tuning unit 158 controls the optical signal output of the optical transceiver 110 to be turned off and causes the optical transceiver 110 to be in a standby state. Moreover, if a new optical path is added, the tuning unit 158 tunes an optical transceiver 110 used for the new path to the channel of the new path, and then controls the optical signal output to be turned on for being activated.

The selection unit 156 selects an optical transceiver 110 to be used, when a new optical path is added. In the present exemplary embodiment, the selection unit 156 accesses the memory 152, and selects an optical transceiver 110 in the channel range corresponding to the channel of the new optical path, by referring to the optical transceiver management table 160. In this manner, when the new optical path is set, the selection unit 156 can preferentially select an unconnected standby optical transceiver 110 which has a short frequency setting time.

In addition, in FIG. 1, since the transceiver aggregator 130 and the switch 132 are not related to the essence of the present invention, the detailed description thereof will be not repeated. In the present exemplary embodiment, the switch 132 on the optical network 3 side has been formed of a frequency selection switch or a splitter described in Non-Patent Document 1.

In addition, for example, a configuration (wavelength path de-multiplexer) described in another invention (Japanese Patent Application No. 2010-213551) that has been filed by the applicant of the present invention may be used for the transceiver aggregator 130. The transceiver aggregator 130 includes sets of Arrayed Waveguide Gratings (AWG) and optical matrix switches equal to the number of Add or Drop directions or degrees of a Reconfigurable Optical Add/Drop Multiplexer (ROADM), and further includes an optical switch for switching directions or degrees equal to the number of transceivers to be accommodated. Then, the optical matrix switch and the optical switch are connected, and thus the connection between a predetermined direction or degree and a predetermined transceiver may be established. In this manner, the transceiver aggregator 130 enables the optical transceivers 110 to be shared by the plurality of directions or degrees. In addition, configurations other than the present configuration are possible. For example, a configuration of a transceiver aggregator using a plurality of WSSs described in Non-Patent Document 1 is also possible.

In addition, respective constitutional elements of the network apparatus 100 described above are achieved by any combination of software and hardware of a computer including a Central Processing Unit (CPU), a memory, a program loaded in the memory for achieving the constitutional elements of the present drawing, a storage unit such as a hard disk that stores the program, and an interface for network connection. So, it will be appreciated by those skilled in the art that there are various modifications to the achieving method and device. Each drawing to be described below does not show configurations in hardware units, but shows blocks in functional units.

The computer program of the present exemplary embodiment is described so as to cause a computer connected to a plurality of transceivers 110 having frequency variable characteristics to perform a procedure for allocating different frequencies to the setting channels of standby optical transceivers 110 that are not connected to the network 3 and are set to a standby state, among a plurality of transceivers (optical transceivers 110) and a procedure for preferentially selecting and using an optical transceiver 110 having a short channel setting time among the standby optical transceivers 110, when a path is newly set in the optical network 3.

The computer program of the present exemplary embodiment may be recorded in a computer readable recording medium. The recording medium is not particularly limited, but various forms are considered. In addition, the program may be loaded into the memory of the computer from the recording medium, and may be downloaded to the computer through the network and loaded into the memory.

The operation of the network apparatus 100 of the present exemplary embodiment configured in this manner will be described below.

FIG. 5 is a flowchart illustrating an example of the operations of the optical transceiver control unit 150 at the time of initial setting or at the time of change setting of the network apparatus 100 of the present exemplary embodiment. Hereinafter, the operations of the optical transceiver control unit 150 at the time of initial setting or at the time of change setting of the network apparatus 100 of the present exemplary embodiment will be described using FIGS. 1 to 8. In addition, the state of the optical transceiver management table 160 will be described using FIGS. 6 to 8, and FIG. 4.

First, in the optical transceiver control unit 150, the channel allocation unit 154 confirms the optical transceiver group 120 that is installed, and records the states of the optical transceivers 110 in the memory 152 (step S101). FIG. 6 shows an example of the optical transceiver management table 160 in the memory 152 of the optical transceiver control unit 150 at this time. In this exemplary embodiment, the optical transceiver management table 160 is used, thereby detecting the number of the unused optical transceivers 110. In general, since the optical transceiver 110 is managed even in the network control with other nodes, the management numbers of the optical transceivers 110 and the management numbers in the network control may be preferably common. Since the network control is not related to the essence of the present invention, the detailed description thereof will be not repeated.

Next, the channel allocation unit 154 of the optical transceiver control unit 150 selects an optical transceiver(s) 110 that requires fast provisioning among unused optical transceivers 110 and manages the selected optical transceiver(s) 110 as the standby optical transceiver group 122 (step S103). At this time, the channel allocation unit 154 of the optical transceiver control unit 150 accesses the memory 152, and as illustrated in FIG. 7, changes the state column 164 in the optical transceiver management table 160 from "unused" to "standby". In this manner, the optical transceiver control unit 150 manages the state of the selected optical transceiver (s) 110 and refers to the optical transceiver management table 160, thereby confirming the number N of the optical transceivers 110 which are on standby.

In addition, in the present exemplary embodiment, it is assumed that all unused optical transceivers 110 are optical transceivers 110 which are on standby. Thus, when the optical path is changed, the control of the optical transceivers 110 which are on standby can be simplified and low cost and low power consumption in the system can be achieved.

However, only a part of the unused optical transceivers 110 may be made the optical transceivers 110 which are on standby. In this case, the control becomes complicated. However, it is possible to employ a method that is described in another invention that the present inventor has filed (Japanese Patent Application No. 2010-271150). In this method, it is possible to combine a control to set only a part of the unused optical transceivers 110 to a fast bootable standby state and a control to set remaining unused optical transceivers 110 to a standby mode in which electric power is further dropped. Therefore, the electric power suppression of the network apparatus 100 becomes possible. In addition, the number of the optical transceivers that stands by in the fast bootable standby state is optimized according to the communication situation, so that it is possible to reduce effective energy consumption of the entire optical network 3.

Next, the tuning unit 158 of the optical transceiver control unit 150 performs an initial setting to a standby state with respect to the standby optical transceiver group 122 (step S105). At this time, the standby optical transceiver group 122 keeps all optical outputs in off state.

Then, the channel allocation unit 154 of the optical transceiver control unit 150 allocates frequency of the frequency tunable laser or the frequency tunable filter within the respective network apparatus 100 (step S107). In the frequency allocation, the setting frequencies of respective optical transceivers 110 are shifted and set not to be overlapped.

Here, in the present exemplary embodiment, the channel allocation unit 154 allocates the frequencies of the frequency tunable filter and the frequency tunable laser within each standby optical transceiver 110. The channel allocation unit 154 randomly allocates the channels of the plurality of standby optical transceivers 110 within the range of its frequency range of the corresponding network apparatus 100. The random number function may be used in order for the frequencies which are set in respective standby optical transceivers 110 not to overlap. The random number function randomly extracts numeric values so as not to be overlapped, from an integer string corresponding to the channel number of the corresponding ITU-T in the network apparatus 100, to the optical transceiver control unit 150.

The channel allocation unit 154 extracts the number of random numbers equal to the number of the standby optical transceivers using the random number function, and sets a different frequency for each standby optical transceiver based on the numeric value. Then, the channel allocation unit 154 accesses the memory 152, and as illustrated in FIG. 8, records the frequencies that are set in the standby channel setting column 166 of the optical transceiver management table 160. In addition, in the present exemplary embodiment, the setting frequency of each standby optical transceiver 110 is shifted so as not to be overlapped in order to speed up the optical path setting, but the random number control becomes complicated. Note that the complexity of the present control is independent of the optical path setting time. Therefore, it is also possible to simplify the control by allowing partial overlapping.

Then, the channel allocation unit 154 determines which standby optical transceiver is to be allocated with the channel at the time of new path setting, based on the relationship between the channel and frequency tuning parameters of the frequency tunable laser and frequency tunable filter (step S109). This allocation is performed so as to reduce the amount of the tuning parameters when switching from each standby optical transceiver 110 to the channel for the new path setting. It will be described in detail later. The channels that are allocated in step S109 are recorded in the corresponding channel column 168 of the optical transceiver management table 160 as illustrated in FIG. 4.

Figure 9:
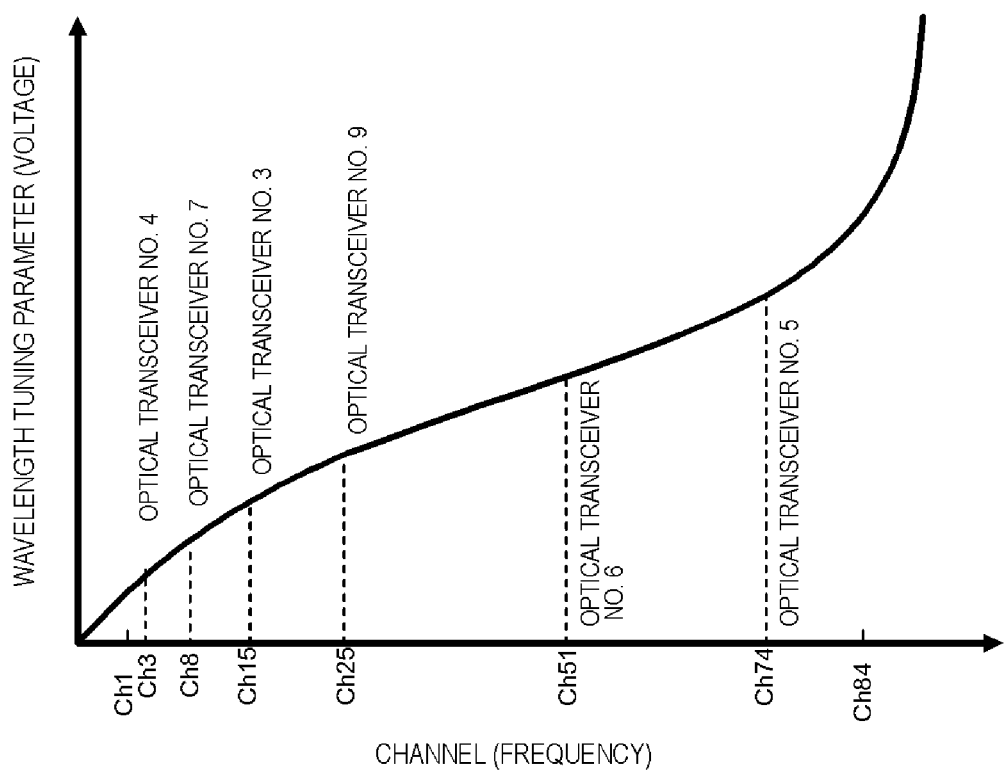
FIG. 9 is a diagram illustrating a relationship example between wavelength tuning parameters and channels in the exemplary embodiment of the present invention.

FIG. 9 shows a relationship between channels and the frequency tuning parameters (voltage) (in FIG. 9, shown as "wavelength tuning parameter") in the frequency tunable filter or the frequency tunable laser used in the present exemplary embodiment. In FIG. 9, the standby channel of each standby optical transceiver shown in the optical transceiver management table 160 of FIG. 8 is indicated as a broken line. The frequency tuning parameter value (voltage) of each channel is compared with the frequency tuning parameter value at the standby channel of each standby optical transceiver, and allocation is determined so as for a parameter difference to be minimum. The ranges of the allocated channels are recorded in the corresponding channel column 168 of the optical transceiver management table 160 as illustrated in FIG. 4.

In addition, allocation is derived using the relationship between the selection frequencies and the tuning parameters of all frequency tunable filters or all frequency tunable lasers in this exemplary embodiment, but other methods may be applied. For example, the channels of the standby optical transceivers may be allocated based on the relationship between the channel and one frequency tuning parameter of the frequency tunable filter or the frequency tunable laser when the same kind of frequency tunable filter or frequency tunable laser is used. Alternatively, the allocation may be performed using an average property thereof. Otherwise, by linearly approximating the relationship between frequency tuning parameters and the selection frequencies, allocation may be determined based on only the channel difference. The control is simplified by these methods, thereby enabling the control cost to be reduced.

In addition, since the frequency tunable filter used in each optical transceiver 110 has the same configuration like the present exemplary embodiment, it is not necessary to perform the calculation of the tuning parameter individually, such that control is simplified and that speeding-up and control cost reduction can be achieved. At least, the respective frequency tunable filters of a transmitter and a receiver in the optical transceivers 110 are unified, so that control is simplified and the speeding-up and control cost reduction can be achieved. In addition, when a plurality of different frequency tunable filters are used and the operation speeds are different, only the frequency tunable filter having a slow operation speed is controlled, so that control is simplified and the speeding-up and control cost reduction can be achieved.

Next, the operation when optical paths are added or deleted in the network apparatus 100 according to the present exemplary embodiment will be described with reference to FIG. 1, FIG. 3, FIG. 4, and FIGS. 10 to 12. FIG. 10 is a flowchart illustrating the operation at the time of the optical path setting of the optical transceiver control unit of the network apparatus according to the exemplary embodiment of the present invention. FIGS. 11 and 12 are diagrams showing examples of the optical transceiver management table after the optical paths are set in the exemplary embodiment of the present invention.

First, the channel allocation unit 154 of the optical transceiver control unit 150 confirms commands relating to the optical path setting from the network control unit (not shown) (step S201). Here, in a case of a command to add an optical path, the process proceeds to step S203, while in a case of a command to delete an optical path, the process proceeds to step S211. In addition, the network control unit is intended to control remotely a plurality of network apparatuses 100 on the optical network 3 so as to control communication. Since the control of the optical path setting from the network control unit is not related to the essence of the present invention, a detailed description thereof will be not repeated.

In a case of the command to add an optical path, the selection unit 156 of the optical transceiver control unit 150 selects a standby optical transceiver in step S203 in which the change amount in the tuning parameter is the smallest. In the present exemplary embodiment, the selection is performed based on the installed optical transceiver management number column 162 of the optical transceiver management table 160 illustrated in FIG. 4. For example, in a case of setting a new path of channel 40 (λ40), the selection unit 156 accesses the memory 152 and selects the optical transceiver No. 6 of which λ40 is included in the corresponding channel range in the corresponding channel column 168 of the optical transceiver management table 160. In addition, in a case of setting a new path of channel 10 (λ10), the selection unit 156 selects the optical transceiver No. 7 of which λ10 is included in the corresponding channel range in the corresponding channel column 168 of the optical transceiver management table 160.

Next, the tuning unit 158 of the optical transceiver control unit 150 sets the channel by tuning the standby optical transceiver 110 to the channel used in the new path (step S205). Then, the tuning unit 158 of the optical transceiver control unit 150 activates the standby optical transceiver (step S207). The output of the optical signal, that has been controlled to be turned off during standby, is controlled to be turned on.

Then, the channel allocation unit 154 of the optical transceiver control unit 150 accesses the memory 152 and updates the optical transceiver management table 160 (step S217). Here, the update result of the optical transceiver management table 160 at the time of setting of the new path of channel 40 is illustrated in FIG. 11. The state column 164 of the used optical transceiver No. 6 is changed from "standby" to the used state (denoted as "activated" in the drawing), and the corresponding channels of the optical transceiver No. 5 and the optical transceiver No. 9 that are on standby in the channel closest to λ40 are respectively modified, such that the optical transceiver management table 160 is updated. This update method is the same as the method described in step S109 in FIG. 5.

Next, a case of deleting an optical path will be described.

First, in step S211, the tuning unit 158 of the optical transceiver control unit 150 causes the optical transceiver to become an unused state by turning off the optical output of the optical transceiver to be deleted. Here, a case of stopping the optical transceiver No. 1 will be described.

Next, the tuning unit 158 of the optical transceiver control unit 150 makes the optical transceiver 110 in the unused state to be in a standby state as necessary. In order to make and manage all unused optical transceivers to be in a standby state in this exemplary embodiment, the tuning unit 158 of the optical transceiver control unit 150 makes the optical transceiver No. 1 in the unused state in step S211 to be in a standby state as an initial setting (step S213). The initial setting is the same as that of step S105 in FIG. 5.

Next, the tuning unit 158 of the optical transceiver control unit 150 allocates channels to the standby optical transceivers that are newly joined (step S215). Allocated channels are determined using the random number function described in step S107 of FIG. 5. Here, as illustrated in FIG. 12, λ60 is allocated.

Then, the tuning unit 158 records the changing points obtained in steps S211 to S215 in the optical transceiver management table 160 stored in the memory 152 so as to be updated (step S217). As an example, the update result of the optical transceiver management table 160 when the optical path that has been formed for the optical transceiver No. 1 is deleted and the standby channel is allocated with λ60 in step S215 is illustrated in FIG. 12.

At this time, with respect to the standby channel λ60 of the optical transceiver No. 1 which is newly on standby, corresponding channels of the optical transceiver on standby in the closest frequencies on a long frequency side and a short frequency side respectively are modified. In this case, the corresponding channels of the optical transceiver No. 5 and optical transceiver No. 6 are modified. For example, although the corresponding channels of the optical transceiver No. 5 have been λ63 to λ84 in FIG. 4, the corresponding channels are updated to λ68 to λ84 as seen in FIG. 12. In addition, the corresponding frequencies are determined by the method described in step S109 of FIG. 5.

In addition, although the transceiver aggregator 130 and the switch 132 also perform control at the time of optical path setting, since the control of the transceiver aggregator 130 and the switch 132 are not related to the essence of the present invention, the description thereof will not be repeated.

In the present exemplary embodiment, shortening a time for setting a new optical path can be achieved.

Figure 13:
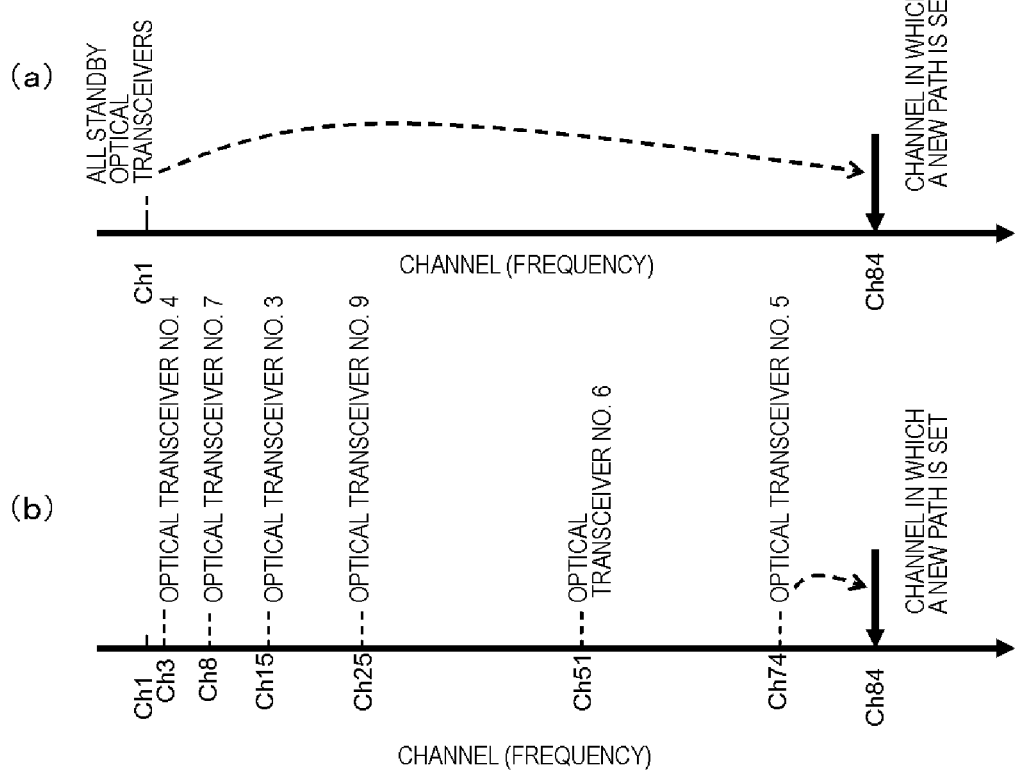
FIG. 13 is a diagram for explaining a difference between a case where the optical path setting of the present invention is not performed and the optical path setting is performed in the exemplary embodiment of the present invention.

For example, in a case where a standby optical transceiver is not prepared, large delay occurs in changing the tuning parameters. In addition, even if the standby optical transceiver is prepared, it is regarded that the standby channel is fixed, for example, the standby optical transceiver has been installed in the situation that the standby channel is fixed to in the channel 1 corresponding to the end of the frequency band used as an initial setting frequency. In that case, as illustrated in FIG. 13 (a), when a frequency is set to an end (channel 84) of another frequency band, the changing width of the frequency is large, so it takes time to change the tuning parameter and large delay occurs.

However, in the network apparatus 100 according to the exemplary embodiment of the present invention, as illustrated in FIG. 13(b), the setting frequencies of the standby optical transceiver group 122 are discretely arranged within its frequency range corresponding to the network apparatus 100. Then, the standby optical transceiver of which changing amount in the turning parameter is small is selected, so that the changing amount of the tuning parameter is suppressed to be small at the high probability and optical path setting time is shortened. In FIG. 13(b), the optical transceiver No. 5 is selected and a frequency is set from channel 74 to channel 84, so that as compared with the case in FIG. 13(a), it is understood that the changing width of the frequency setting is significantly reduced.

In the above-described configuration, a method of controlling the network apparatus 100 of the present exemplary embodiment is method of controlling a network in which the network apparatus 100 that controls a plurality of transceivers (optical transceivers 110) having frequency variable characteristics, including: allocating different frequencies to the setting channels of the standby optical transceivers 110 that are not connected to the network 3 and are set to a standby state among the plurality of transceivers 110; tuning the standby optical transceivers 110 to the frequencies of the allocated channels by changing respective parameters; and preferentially selecting and uses an optical transceiver 110 having a short channel setting time among the standby optical transceivers 110 when a path is newly set in the optical network 3.

As described above, according to the optical network system 1 and the network apparatus 100 in the exemplary embodiment of the present invention, there is an effect to achieve a network apparatus 100 in which the change amount in the frequency tuning parameter to change the frequency can be suppressed to be small, the change time is shortened, and an optical path can be set at a high speed when the unconnected standby optical transceivers are used in setting a new optical path.

In addition, it is possible to use existing transceivers, and thus to build a system at a low cost. Further, the control of the unconnected standby optical transceivers can be simplified, and both speeding-up and cost reduction of the optical path setting are possible.

Second Exemplary Embodiment

In an optical network system of the present exemplary embodiment, a frequency setting method of a frequency tunable laser or a frequency tunable filter which is on standby within the network apparatus 100 is different from the above exemplary embodiment. Specifically, the network apparatus 100 of the present exemplary embodiment is different from the above exemplary embodiment in that the channels of the standby optical transceivers are set at the same interval with respect to the frequency band Δf corresponding to the network apparatus 100. This is related to the step of S109 of FIG. 5 of the above exemplary embodiment.

The network apparatus of the present exemplary embodiment has the same configuration as the network apparatus 100 of the above exemplary embodiment described with reference to FIGS. 1 to 5 and FIG. 10. Description shall be made using the same drawings even in the present exemplary embodiment.

In the network apparatus 100 according to the exemplary embodiment of the present invention, when a plurality of standby optical transceivers are present among the plurality of optical transceivers 110, the channel allocation unit 154 respectively sets the setting channels of the standby optical transceivers of N units (N is an integer of two or more) in respective configurable frequencies closest to center frequencies of frequency ranges Δfi (i is an integer of 1 to N+1) obtained by dividing a frequency range Δf of the network apparatus 100 by the number N.

Specifically, the channel allocation unit 154 allocates the channels of the standby optical transceivers at the same interval with respect to the frequency band Δf corresponding to the network apparatus 100. In addition, each channel of DWDM is standardized by the ITU and has the constant frequency interval.

Figure 14:
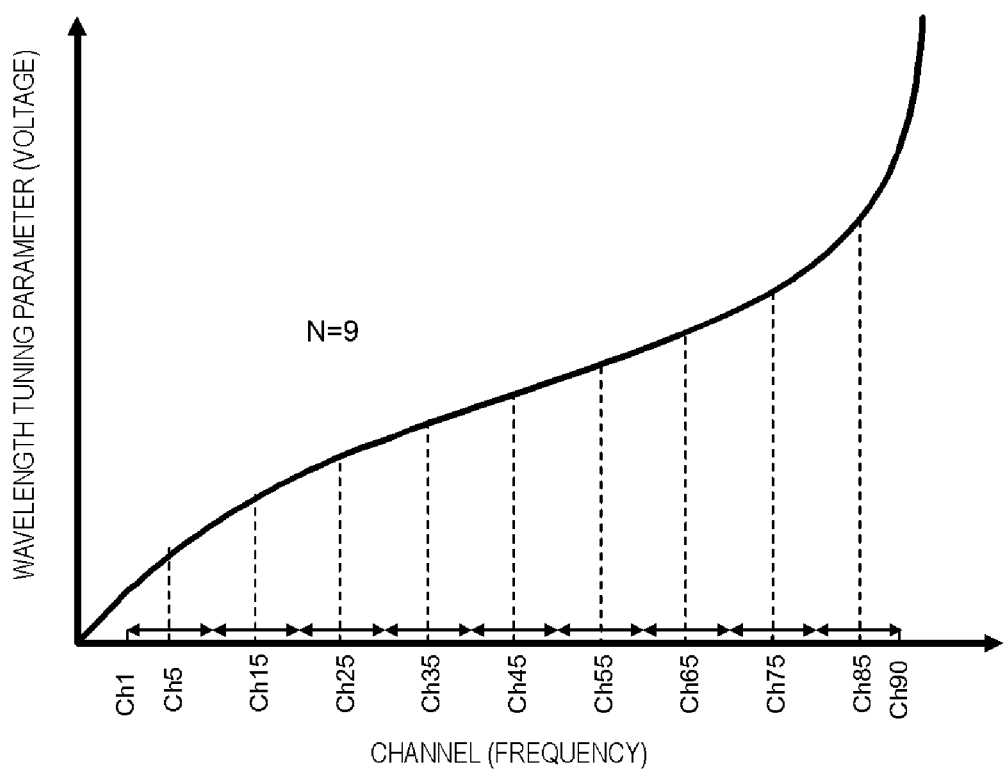
FIG. 14 is a schematic diagram for explaining an optical transceiver channel setting method of the optical transceiver control unit of the network apparatus according to the exemplary embodiment of the present invention.

The frequency setting method is described assuming that the number of the standby optical transceivers is N. First, the frequency band covering channel 1 to channel 90 is considered as the frequency band Δf. Next, the frequency band Δf is divided by the number N. The channels in the vicinity of the center frequencies of the divided frequency bands Δfi (i is an integer from 1 to N) are regarded as setting channels of respective standby optical transceivers, and are recorded in the standby channel setting column 166 of the optical transceiver management table 160 stored in the memory 152 by the channel allocation unit 154. In addition, the channel allocation unit 154 records the channel range within the frequency band Δfi as the corresponding channels in the corresponding channel column 168 of the optical transceiver management table 160 stored in the memory 152. FIG. 14 shows a channel setting example when N=9.

According to the optical network system of the exemplary embodiment of the present invention, an effect similar to that of the above-described exemplary embodiment is shown, and because the setting frequencies of the standby optical transceiver group are evenly distributed as compared with the case of FIG. 13 (a), the tuning parameter amount for frequency setting is reduced to about one-Nth. Thus, shortening of time for setting an optical path newly is achieved. Further, since a simple control similar to the above exemplary embodiment is performed in the present exemplary embodiment, shortening of the control time and cost reduction is possible.

Third Exemplary Embodiment

In an optical network system of the present exemplary embodiment, a frequency setting method of a frequency tunable laser or a frequency tunable filter which is on standby within the network apparatus 100 is different from the above exemplary embodiments. Specifically, a network apparatus 100 of the above exemplary embodiment is different from that of the above exemplary embodiment in that frequency tuning parameter values of standby optical transceivers are set at the same interval with respect to setting range of the frequency tuning parameter. This is related to the procedure of step S109 of FIG. 5 of the above exemplary embodiment.

The network apparatus of the present exemplary embodiment has the same configuration as the network apparatus 100 of the above exemplary embodiment described with reference to FIGS. 1 to 5 and FIG. 10. Description shall be made in the present exemplary embodiment by using the same configuration diagram.

In the network apparatus 100 according to the exemplary embodiment of the present invention, when a plurality of standby optical transceivers are present among a plurality of optical transceivers 110, it is assumed that the number of the plurality of standby transceivers is N units (N is an integer of two or more), the channel allocation unit 154 divides the frequency tuning parameter range of parameters necessary for tuning a frequency range $\Delta f$ of the network apparatus 100 by the number N, and sets the frequencies of the channels of N units of standby optical transceivers as the center values of N parts of divided frequency tuning parameter ranges.

Figure 15:
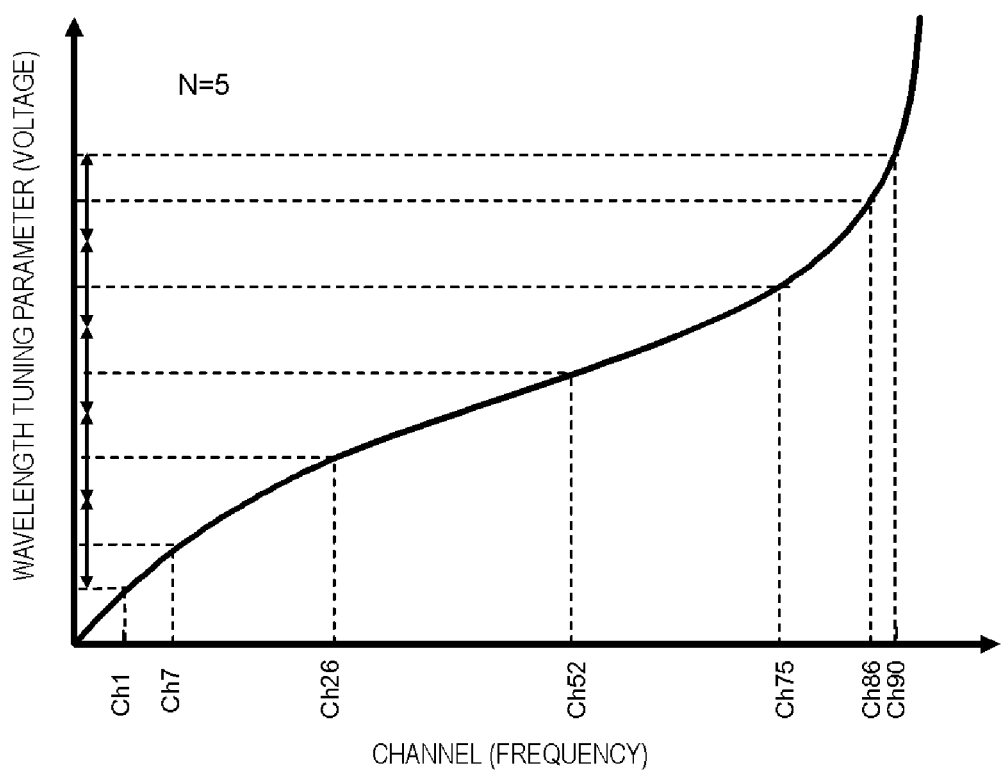
FIG. 15 is a schematic diagram for explaining an optical transceiver channel setting method of the optical transceiver control unit of the network apparatus according to the exemplary embodiment of the present invention.

In the present exemplary embodiment, the channel allocation unit 154 sets the frequency tuning parameter values of standby optical transceivers at regular intervals with respect to the setting range of the tuning parameter. The frequency channel setting method is described assuming that the number of the standby optical transceivers is N units. The tuning parameter range is first divided by the number N. The standby optical transceivers are set to corresponding closest channels in the vicinity of the center values of the divided respective tuning parameter bands. FIG. 15 shows a channel setting example when N=5. In addition, the allocation range of the corresponding channels to be recorded in the corresponding channel column 168 of the optical transceiver management table 160 is the same as the above exemplary embodiment.

According to the network apparatus in the exemplary embodiment of the present invention, since the setting channels of the standby optical transceiver group are arranged at the same interval with respect to the tuning parameter, the tuning parameter amount for the frequency setting is suppressed to one Nth or less. Thus, shortening of time for setting an optical path newly is achieved. Further, since a simple control similar to the above exemplary embodiment described using FIG. 14 is performed in the network apparatus of the present exemplary embodiment, shortening of the control time and cost reduction is also possible.

In addition, although description has been made assuming that there is one tuning parameter in the present exemplary embodiment, the present exemplary embodiment is applicable even to a frequency tunable laser or a frequency tunable filter in which the number of tuning parameters is two or more. However, dividing all tuning parameters equally is complicated for control. In contrast, preferentially dividing the parameters having large tuning parameter delay results in both control simplification and tuning time reduction.

As described above, according to the optical network system in the exemplary embodiment of the present invention, the same effect as the above exemplary embodiment is achieved.

Fourth Exemplary Embodiment

An optical network system 200 of the present exemplary embodiment is different from the above exemplary embodiment in that the optical network system 200 further includes a network management control unit 210 that manages communication with each node. In addition, the optical network system 200 of the present exemplary embodiment may be applied in any configuration of the above exemplary embodiments.

The basic configuration of the optical network system 200 according to the exemplary embodiment of the present invention is illustrated in FIG. 16. The network apparatus 100 according to the exemplary embodiment of the present invention further includes an acquisition unit (network management control unit 210) that acquires information relating to unoccupied channel that can be newly set in the network 3 in the network apparatus 100 and a determination unit (not shown, it may be included in the channel allocation unit 154) that sets a frequency range $\Delta fa$ that can be obtained based on the acquired information relating to unoccupied channel and determines the channels of the N units of standby optical transceivers 110 based on the $\Delta fa$ instead of the $\Delta f$, and the channel allocation unit 154 sets the determined channels of the N units of standby optical transceivers 110.

Specifically, the optical network system 200 of the present exemplary embodiment includes a transceiver aggregator 130, a switch 132, a plurality of optical transceivers 110, and an optical transceiver control unit 150 in the same manner as the network apparatus 100 of the above exemplary embodiment, and further includes a network management control unit 210 that manages communication with each node.

The network management control unit 210 obtains information relating to unoccupied channel regarding each direction or degree from the control plane 202 which controls between neighboring nodes and the whole network, and provides the information relating to unoccupied channel to the optical transceiver control unit 150. The channel allocation unit 154 of the optical transceiver control unit 150 senses channels which can set new paths, based on the information relating to unoccupied channel. The channel allocation unit 154 extracts the channel range that can be taken from the information relating to unoccupied channel, and sets the frequencies of the standby optical transceivers based on the channel range. In addition, for the operation procedures of the present exemplary embodiment, procedures similar to the operation of the above exemplary embodiment except for setting the frequency range may be used.

Thus, it becomes possible to suppress the frequency setting range to be small depending on the use status of the network, and tuning time can be speeded up.

In addition, when the number of the unoccupied channels is equal to or smaller than the number of standby optical transceivers, it is possible to set the setting channels of the standby optical transceivers to the unoccupied channels. Thus, tuning time is no longer required, and optical path setting can be speeded up.

As described above, according to the optical network system 200 in the exemplary embodiment of the present invention, the same effect as the exemplary embodiment is achieved, the frequency setting range can be suppressed to be small depending on the use status of the network and a tuning time can be further speeded up.

Although the foregoing description has been made about exemplary embodiments of the present invention with reference to drawings, these are illustrative of the present invention and it is possible to employ various configurations other than the above configuration.

For example, in the above exemplary embodiments, the optical network system using wavelength division multiplexing technology has been described, but is not limited thereto. The above exemplary embodiments are applicable to all systems using a multiplexing technology and all systems implementing multiplex by analog technology.

Considering application to the wavelength division multiplexing technology, the above exemplary embodiments are applicable to an optical communication system and a wireless communication system in general.

In addition, the selection unit 156 may preferentially select an optical transceiver closest to the frequency of the channel of the path to be newly set from the frequencies of the channels of standby optical transceivers to which the channel allocation unit 154 has allocated the channels.

According to this configuration, it is not necessary to consider the tuning parameter in the update process of the channel allocation of the optical transceiver management table 160 after the selection, and the process can be simplified.

while the invention has been particularly shown and described with reference to exemplary embodiments and examples thereof, the invention is not limited to these exemplary embodiments and examples. It will be understood by those of ordinary skill in the art that various changes in form and details may be made therein without departing from the sprit and scope of the present invention as defined by the claims.

The present invention may include following aspects.

(Supplementary Note 1)

A network apparatus including:

a plurality of transceivers each of which has a frequency variable characteristic and communicates on an allocated channel;

a channel allocation unit which allocates frequencies different from each other to channels of standby transceivers that are not connected to a network and are set to a standby state, among the plurality of transceivers;

a tuning unit which tunes the standby transceivers to the frequencies of the allocated channels by changing respective parameters; and a selection unit which preferentially selects and uses a transceiver having a short channel setting time among the standby transceivers, when a path is newly set in the network.

(Supplementary Note 2)

The network apparatus according to Supplementary note 1, in which when a plurality of standby transceivers are present among the plurality of transceivers, the channel allocation unit randomly allocates the channels of the plurality of standby transceivers within a range of a frequency range of the network apparatus.

(Supplementary Note 3)

The network apparatus according to Supplementary note 1, in which when a plurality of standby transceivers are present among the plurality of transceivers, the channel allocation unit randomly allocates the channels of the plurality of standby transceivers so as not to be overlapped within a range of a frequency range of the network apparatus.

(Supplementary Note 4)

The network apparatus according to Supplementary note 1, in which when a plurality of standby transceivers are present among the plurality of transceivers, the channel allocation unit respectively sets the channels of the standby transceivers of N units (N is an integer of two or more) in respective configurable frequencies closest to center frequencies of frequency ranges $\Delta f_i$ (i is an integer of 1 to N+1) obtained by dividing a frequency range $\Delta f$ of the network apparatus by the number N.

(Supplementary Note 5)

The network apparatus according to Supplementary note 1, in which when a plurality of standby transceivers are present among the plurality of transceivers, the number of the plurality of standby transceivers is set to N units (N is an integer of two or more), and in which the channel allocation unit divides a frequency tuning parameter range of the parameter required for tuning the frequency range $\Delta f$ of the network apparatus into N parts and sets the frequencies of the channels of N units of standby transceivers to center values of the frequency tuning parameter ranges which are divided into N parts.

(Supplementary Note 6)

The network apparatus according to any one of Supplementary notes 2 to 5, further including:

an acquisition unit which acquires information relating to unoccupied channels that can be newly set in the network of the network apparatus; and a determination unit which sets a frequency range $\Delta f_a$ that can be obtained based on the acquired information relating to unoccupied channels, and determines the channels of the N units of standby transceivers based on the $\Delta f_a$ instead of the $\Delta f$, in which the channel allocation unit sets the channels of the N units of standby transceivers determined by the determination unit.

(Supplementary Note 7)

The network apparatus according to any one of Supplementary notes 1 to 6, in which the selection unit preferentially selects a transceiver of which frequency is closest to the frequency of the channel of the path that is newly set, from the frequencies of the channels of the standby transceivers of which channels are allocated by the channel allocation unit.

(Supplementary Note 8)

The network apparatus according to any one of Supplementary notes 1 to 7, in which the transceiver is an optical transceiver, and in which the network apparatus further includes an optical transceiver aggregator having a matrix switch that can connect any optical transceiver in any optical frequency to any optical fiber of an optical fiber group formed by a plurality of optical fibers connected to a plurality of different network apparatuses, and the plurality of optical transceivers are connected to the optical transceiver aggregator.

(Supplementary Note 9)

The network apparatus according to any one of Supplementary notes 1 to 8, in which the transceiver includes only one kind of frequency tunable laser.

(Supplementary Note 10)

The network apparatus according to any one of Supplementary notes 1 to 9, in which the transceiver includes only one kind of frequency tunable filter.

(Supplementary note 11)

The network apparatus according to any one of Supplementary notes 1 to 10, in which the transceiver includes a variable frequency selection device which selects one frequency from a plurality of frequencies, and in which the variable frequency selection device has one frequency tuning parameter.

(Supplementary Note 12)

The network apparatus according to Supplementary note 11, in which the channel allocation unit allocates a channel of the standby transceiver, based on a relationship between a frequency tuning parameter and a channel of the variable frequency selection device being used.

(Supplementary Note 13)

The network apparatus according to Supplementary note 11, in which the channel allocation unit allocates a channel of the standby transceiver, based on a relationship between one frequency tuning parameter and a channel of the variable frequency selection device being used, with a transceiver of the same kind of the variable frequency selection device.

(Supplementary Note 14)
A network system using the network apparatus according to any one of Supplementary notes 1 to 13.

(Supplementary Note 15)
A method of controlling a network executed by a network apparatus which controls a plurality of transceivers having a frequency variable characteristic, including
allocating frequencies different from each other to setting channels of standby transceivers that are not connected to a network and are set to a standby state, among the plurality of transceivers;
tuning the standby transceivers to the frequencies of the allocated channels by changing respective parameters; and
preferentially selecting and using a transceiver having a short channel setting time among the standby transceivers, when a path is newly set in the network.

(Supplementary Note 16)
The method of controlling a network according to Supplementary note 15,
in which when a plurality of standby transceivers are present among the plurality of transceivers, the channels of the plurality of standby transceivers are randomly allocated within a range of a frequency range of the network apparatus.

(Supplementary Note 17)
The method of controlling a network according to Supplementary note 15,
in which when a plurality of standby transceivers are present among the plurality of transceivers, the channels of the plurality of standby transceivers are randomly allocated so as not to be overlapped within a range of a frequency range of the network apparatus.

(Supplementary Note 18)
The method of controlling a network according to Supplementary note 15,
in which when a plurality of standby transceivers are present among the plurality of transceivers, the channels of the standby transceivers of N units (N is an integer of two or more) are set in respective configurable frequencies closest to center frequencies of frequency ranges $\Delta f_i$ (i is an integer of 1 to N+1) obtained by dividing a frequency range $\Delta f$ of the network apparatus by the number N.

(Supplementary Note 19)
The method of controlling a network according to Supplementary note 15,
in which when a plurality of standby transceivers are present among the plurality of transceivers, the number of the plurality of standby transceivers is set to N units (N is an integer of two or more), and
in which a frequency tuning parameter range of the parameter required for tuning the frequency range $\Delta f$ of the network apparatus is divided into N parts and the frequencies of the channels of N units of standby transceivers are set to center values of the frequency tuning parameter ranges which are divided into N.

(Supplementary Note 20)
The method of controlling a network according to any one of Supplementary notes 16 to 19, further including:
acquiring information relating to unoccupied channels that can be newly set in the network of the network apparatus;
setting a frequency range $\Delta f_a$ that can be obtained based on the acquired information relating to unoccupied channels;
determining the channels of the N units of standby transceivers based on the $\Delta f_a$ instead of the frequency range $\Delta f$ of the network apparatus; and
setting the determined channels of the N units of standby transceivers.

(Supplementary Note 21)
The method of controlling a network according to any one of Supplementary notes 15 to 20,
in which a transceiver, of which frequency is closest to the frequency of the channel of the path that is newly set, is preferentially selected, from the frequencies of the channels of the standby transceivers of which channels are allocated.

(Supplementary Note 22)
A program causing a computer which is connected to a plurality of transceivers having frequency variable characteristics and achieves a network apparatus to perform:
a procedure for allocating frequencies different from each other to setting channels of standby transceivers that are not connected to a network and are set to a standby state, among the plurality of transceivers;
a procedure for tuning the standby transceivers to the frequencies of the allocated channels by changing respective parameters; and
a procedure for preferentially selecting and using a transceiver having a short channel setting time among the standby transceivers, when a path is newly set in the network.

(Supplementary Note 23)
The program according to Supplementary note 22, further causing the computer to perform a procedure for randomly allocating the channels of the plurality of standby transceivers within a range of a frequency range of the network apparatus when a plurality of standby transceivers are present among the plurality of transceivers.

(Supplementary Note 24)
The program according to Supplementary note 22, further causing the computer to perform a procedure for randomly allocating the channels of the plurality of standby transceivers so as not to be overlapped within a range of a frequency range of the network apparatus when a plurality of standby transceivers are present among the plurality of transceivers.

(Supplementary Note 25)
The program according to Supplementary note 22, further causing the computer to perform a procedure for setting the channels of the standby transceivers of N units (N is an integer of two or more) in respective configurable frequencies closest to center frequencies of frequency ranges $\Delta f_i$ (i is an integer of 1 to N+1) obtained by dividing a frequency range $\Delta f$ of the network apparatus by the number N when a plurality of standby transceivers are present among the plurality of transceivers.

(Supplementary Note 26)
The program according to Supplementary note 22,
in which when a plurality of standby transceivers are present among the plurality of transceivers, the number of the plurality of standby transceivers is set to N units (N is an integer of two or more), and the program further causing the computer to perform a procedure for dividing a frequency tuning parameter range of the parameter required for tuning the frequency range $\Delta f$ of the network apparatus by N parts and to set the frequencies of the channels of N units of standby transceivers to center values of the frequency tuning parameter ranges which are divided into N parts.

(Supplementary Note 27)
The program according to any one of Supplementary notes 23 to 26, further causing the computer to perform:
a procedure for acquiring information relating to unoccupied channels that can be newly set in the network of the network apparatus;
a procedure for setting a frequency range $\Delta f_a$ that can be obtained based on the acquired information relating to unoccupied channels;

a procedure for determining the channels of the N units of standby transceivers based on the Δfa instead of the frequency range Δf of the network apparatus; and a procedure for setting the determined channels of the N units of standby transceivers determined in the determining.

(Supplementary Note 28)

The program according to any one of Supplementary notes 22 to 27, a procedure for preferentially selecting a transceiver, of which frequency is closest to the frequency of the channel of the path that is newly set, from the frequencies of the channels of the standby transceivers of which channels are allocated in the allocating of channel.

This application is based upon and claims the benefit of priority from Japanese Patent Application No. 2011-166222, filed on Jul. 29, 2011, the disclosure of which is incorporated herein in its entirety by reference.

What is claimed is:

1. A network apparatus comprising:
a plurality of transceivers each of which has a frequency variable characteristic and communicates on an allocated channel;
a channel allocation unit which allocates frequencies different from each other to channels of standby transceivers that are not connected to a network and are set to a standby state, among the plurality of transceivers;
a tuning unit which tunes the frequencies of the standby transceivers to the frequencies of the allocated channels by changing respective parameters; and
a selection unit which, when a path is newly set by setting a specific frequency on any one of the standby transceivers so as to connect the standby transceiver to the network, preferentially selects and uses a transceiver having a shortest channel setting time required for change setting of the specific frequency among the standby transceivers.

2. The network apparatus according to claim 1,
wherein when a plurality of the standby transceivers are present among the plurality of transceivers, the channel allocation unit randomly allocates the channels of the plurality of standby transceivers within a range of a frequency range of the network apparatus.

3. The network apparatus according to claim 2, further comprising:
an acquisition unit which acquires information relating to unoccupied channels that can be newly set in the network of the network apparatus; and
a determination unit which sets a frequency range Δfa that can be obtained based on the acquired information relating to unoccupied channels, and determines the channels of the N units of standby transceivers based on the Δfa instead of the frequency range Δf of the network apparatus,
wherein the channel allocation unit sets the channels of the N units of standby transceivers determined by the determination unit.

4. The network apparatus according to claim 1,
wherein when a plurality of the standby transceivers are present among the plurality of transceivers, the channel allocation unit randomly allocates the channels of the plurality of standby transceivers so as not to be overlapped within a range of a frequency range of the network apparatus.

5. The network apparatus according to claim 1,
wherein when a plurality of the standby transceivers are present among the plurality of transceivers, the channel allocation unit sets the channels of N units of the standby transceivers (N is an integer of two or more) in respective configurable frequencies closest to center frequencies of frequency ranges Δfi (i is an integer of 1 to N+1) obtained by dividing a frequency range Δf of the network apparatus by the number N.

6. The network apparatus according to claim 1,
wherein when a plurality of the standby transceivers are present among the plurality of transceivers, the number of the plurality of standby transceivers is assumed to be N units (N is an integer of two or more), and
wherein the channel allocation unit divides a frequency tuning parameter range of the parameter required for tuning the frequency range Δf of the network apparatus into N parts and sets the frequencies of the channels of the N units of standby transceivers to center values of the frequency tuning parameter ranges which are divided into N parts.

7. The network apparatus according to claim 1,
wherein the selection unit preferentially selects a transceiver of which frequency is closest to the frequency of the channel of the path that is newly set, from the frequencies of the channels of the standby transceivers of which channels are allocated by the channel allocation unit.

8. The network apparatus according to claim 1,
wherein the transceivers are optical transceivers, and
wherein the network apparatus further comprises an optical transceiver aggregator having a matrix switch that can connect any optical transceiver in any optical frequency to any optical fiber of an optical fiber group formed by a plurality of optical fibers connected to a plurality of different network apparatuses, and the plurality of optical transceivers are connected to the optical transceiver aggregator.

9. The network apparatus according to claim 1,
wherein said selection unit further selects a standby optical transceiver in which the change amount in the tuning parameter is the smallest.

10. The network apparatus according to claim 1,
wherein said selection unit selects the standby optical transceiver which has a frequency having the smallest difference from that of the path newly set.

11. A network system using a network apparatus, the network apparatus comprising:
a plurality of transceivers each of which has a frequency variable characteristic and communicates on an allocated channel;
a channel avocation unit which allocates frequencies different from each other to channels of standby transceivers that are not connected to a network and are set to a standby state, among the plurality of transceivers;
a tuning unit which tunes the frequencies of the standby transceivers to the frequencies of the allocated channels by changing respective parameters; and
a selection unit which, when a path is newly set by setting a specific frequency on any one of the standby transceivers so as to connect the standby transceiver to the network, preferentially selects and uses a transceiver having a shortest channel setting time required for change setting of the specific frequency among the standby transceivers.

12. A method of controlling a network executed by a network apparatus which controls a plurality of transceivers having frequency variable characteristics, comprising:
a procedure for allocating frequencies different from each other to channels of standby transceivers that are not connected to a network and are set to a standby state, among the plurality of transceivers;

a procedure for tuning the frequencies of the standby transceivers to the frequencies of the allocated channels by changing respective parameters; and a procedure for, when a path is newly set by setting a specific frequency on any one of the standby transceivers so as to connect the standby transceiver to the network, preferentially selecting and using a transceiver having a shortest channel setting time required for change setting of the specific frequency among the standby transceivers.

* * * * *